US009594494B2

(12) United States Patent
Beaven et al.

(10) Patent No.: US 9,594,494 B2
(45) Date of Patent: Mar. 14, 2017

(54) INTERACTIVE MESSAGING APPARATUS AND METHOD

(71) Applicant: UIEvolution, Inc., Kirkland, WA (US)

(72) Inventors: Travis Beaven, Woodinville, WA (US); Randy Anderson, Woodinville, WA (US)

(73) Assignee: XEVO INC., Kirkland, WA (US)

(*) Notice: Subject to any disclaimer, the term of this patent is extended or adjusted under 35 U.S.C. 154(b) by 175 days.

(21) Appl. No.: 14/285,473

(22) Filed: May 22, 2014

(65) Prior Publication Data

US 2015/0339043 A1 Nov. 26, 2015

(51) Int. Cl.

| | |
|---|---|
| ***G06F 3/00*** | (2006.01) |
| ***G06F 3/0484*** | (2013.01) |
| ***H04L 12/58*** | (2006.01) |
| ***G06Q 10/10*** | (2012.01) |
| *H04W 8/00* | (2009.01) |
| *H04W 4/06* | (2009.01) |
| *H04W 4/02* | (2009.01) |
| *H04W 4/00* | (2009.01) |

(52) U.S. Cl.

CPC ...... *G06F 3/04847* (2013.01); *G06F 3/04842* (2013.01); *G06Q 10/107* (2013.01); *H04L 51/04* (2013.01); *H04W 4/008* (2013.01); *H04W 4/02* (2013.01); *H04W 4/021* (2013.01); *H04W 4/06* (2013.01); *H04W 8/005* (2013.01)

(58) Field of Classification Search

USPC ........................................ 715/752, 738, 740

See application file for complete search history.

(56) References Cited

U.S. PATENT DOCUMENTS

2006/0136295 A1* 6/2006 Bobick .................. G06Q 30/02 705/14.66
2009/0029728 A1* 1/2009 Shen ..................... H04W 48/14 455/507
2010/0293462 A1* 11/2010 Bull ...................... G06F 9/4445 715/716
2012/0054040 A1* 3/2012 Bagherjeiran ......... G06Q 30/00 705/14.66
2013/0325620 A1* 12/2013 Walker ............... G06Q 30/0623 705/14.64

OTHER PUBLICATIONS

May Wong, IPhone ushers in a new breed of Touch screens, Jun. 30, 2007, The Associated Press.*
Don Krause, Frequency Control in Transportation Application, Dec. 2007, Microwave Journal, pp. 1-5.*

* cited by examiner

*Primary Examiner* — Linh K Pham
*Assistant Examiner* — Tam Tran
(74) *Attorney, Agent, or Firm* — Schwabe, Williamson & Wyatt, P.C.

(57) ABSTRACT

Disclosed embodiments include apparatus, method and storage medium associated with interactive messaging. In embodiments, an apparatus may include an interactive message service to selectively display messages of a collection of messages, in response to navigation controls received from a proximally located portable client device, through a navigation interface provided to the proximally located portable client device by the interactive message service. Other embodiments may be described and claimed.

14 Claims, 6 Drawing Sheets

Computing Device (114) and Display Unit (112)
Portable Client Device (104)
Display Initial Messages ~502
Broadcast Device Discovery Message ~504
Reply Proximity Message ~524
Request Connection & Capabilities ~506
Accept Connection and Provide Capabilities ~ 526
Provide Navigation Interface/Controls ~ 508
Display Higher Level Interactive Messages ~510
Provide Navigation Controls ~ 528
Refresh Higher Level Interactive Messages ~ 512
500

INTERACTIVE MESSAGING APPARATUS AND METHOD

TECHNICAL FIELD

The present disclosure relates to the field of data processing. More particularly, the present disclosure relates to interactive messaging.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Historically, messaging, such as product or service advertisements, and so forth, are done principally through the print media, such as newspaper, flyer or billboard. With the advance of television, broadcast programming has become the principal medium for messaging. Both media has the disadvantage of the inability of the audience being able to interact with the messages.

With the advance of computing and networking technology, including the advance of the Internet, online content has become a significant medium for messaging. Concurrently, electronic bulletin board has also taken on an important role. However, the ability for the audience to interact with the messages remains limited. For example, in the case of online advertising, typically, at most, a user may be taken to a web site or to a video, in response to the user clicking on an online advertisement.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
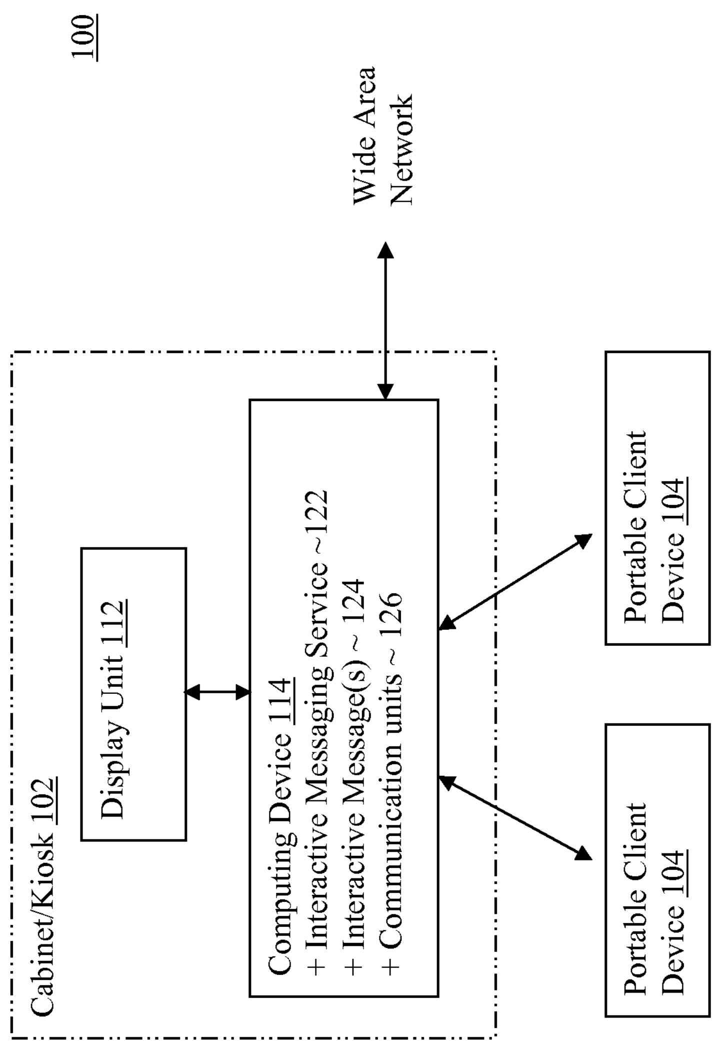
FIG. 1 illustrates an example interactive messaging arrangement, according to the various embodiments.

Disclosed embodiments include apparatus, method and storage medium associated with interactive messaging. In embodiments, an apparatus may include an interactive message service to selectively display messages of a collection of messages, in response to navigation controls received from a proximally located portable client device, through a navigation interface provided to the proximally located portable client device by the interactive message service. The apparatus may further include a display unit to display the messages, and a computing device to operate the interactive message service, including a communication unit.

In embodiments, the interactive message service may include a user interface service and a message rendering service. The user interface service may be configured to provide the client device with the navigation interface to provide the navigation controls to interact with messages of the collection displayed on the display unit. The message rendering service may be configured to select and render on the display unit, messages of the collection, in response to the navigation controls provided through the navigation interface provided to the proximally located portable client device.

In embodiments, the collection of messages may be an interactive advertisement, whereas the portable client device may be a smartphone or a computing tablet, and the apparatus may be a kiosk.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Referring now to FIG. 1, wherein an example interactive messaging arrangement, according to the various embodiments, is illustrated. As shown, arrangement 100 may include display unit 112 and computing device 114 coupled to each other. Display unit 112 may be configured to facilitate display of messages. Computing device 114 may include interactive messaging service 122, interactive messages 124 and communication units 126. Together, these elements may cooperate to enable initial one(s) of interactive messages 124 to be initially rendered on display unit 112 (to draw the attention or interest of the users of portable client devices 104), and subsequently, on discovery and coupling with one or more portable client devices 104 when they are proximally located next to computing device 114, provide each of the one or more portable client devices (104) with a navigational interface having navigation controls, to navigate and interact with additional messages of the interactive messages 124. The various elements, in particular, interactive messaging service 122 and interactive messages 124, will be further described in more detail in turn below.

In embodiments, display unit 112 may be any one of a number of display units known in the art, including but are not limited to flat screen television available from Samsung Electronics of Seoul, Korea, or Sony, Inc. of Tokyo, Japan. Display unit 112 may, e.g., be coupled with computing device 114 through a high definition multimedia interface (HDMI) cable. Computing device 114, except for the incorporation of interactive messaging service 122 and interactive messages 124 of the present disclosure, may likewise be any one of a number of computing devices known in the art, including but are not limited to desktop computers available from Dell Computing of Austin, Tex. or Hewlett Packard of Palo Alto, Calif. Communication units 126 may be configured to conduct wireless communication with proximally located portable client devices 104. The wireless communication may be any one of near field or short range wireless communication known in the art, including but are not limited to near field communication (NFC), Bluetooth or WiFi. In embodiments, communication units 126 may be further configured to communicate with one or more remote servers over a wide area network. For example, communicate units 126 may be further configured to support wired networking, such as Ethernet, to couple computing device 114 to a wide area network, via a wired local area network. As another example, communicate units 126 may be further configured to support wireless networking, such as 4G or 5G LTE.

In embodiments, display unit 112 and computing device 114 may be co-disposed in a cabinet or kiosk 102. In other embodiments, display unit 112 may be wall mounted, and computing device 114 may be disposed in a nearby cabinet or kiosk 102.

Similarly, each portable client device 104 may be any one of a number of portable electronic devices known in the art, including but are not limited to, smartphones, computing tablets, electronic readers, and personal digital assistants, such as Galaxy S4 from Samsung Electronics of Seoul, Korea, or iPad from Apple Computer of Cupertino, Calif. In embodiments, one or more portable computing devices 104 may be a wearable computing device.

Figure 2:
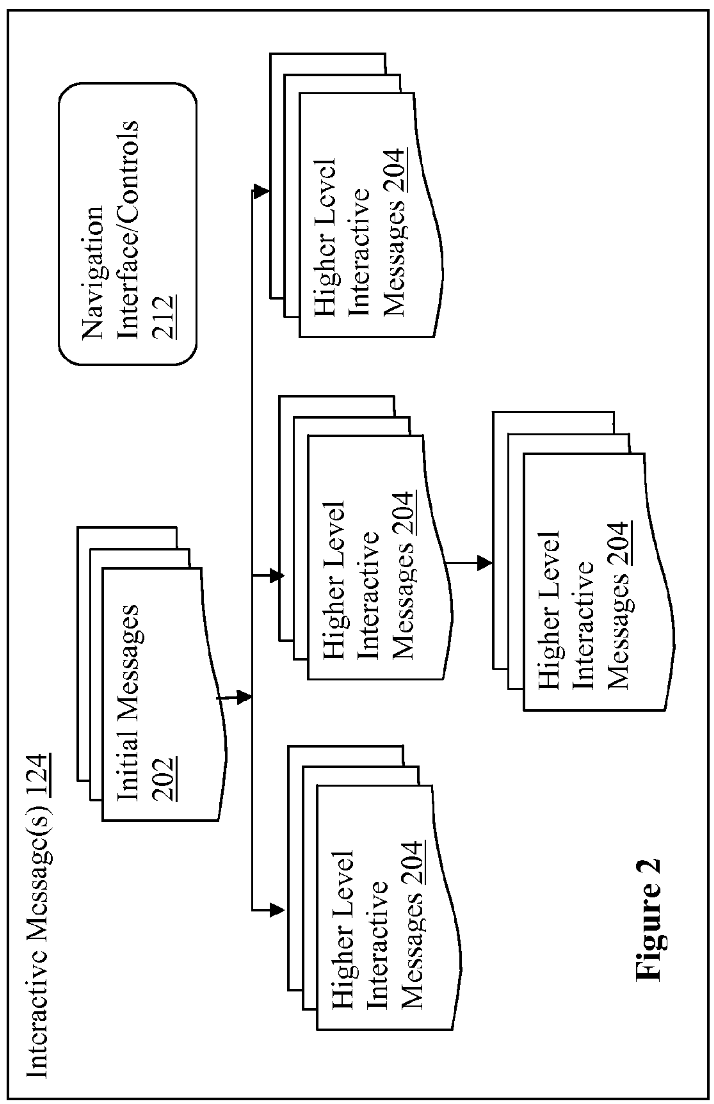
FIG. 2 illustrates an example collection of interactive messages, according to the various embodiments.

Referring now FIG. 2, wherein an example collection of interactive messages, according to the various embodiments, is illustrated. As shown, a collection of interactive messages 124 may include a number of initial messages 202, and a number of higher level interactive messages 204. Further, a collection of interactive messages 124 may include an associated navigation interface 212 with controls to facilitate navigation and interaction with the higher level interactive messages 204. Initial messages 202 may be messages to be rendered initially on display 112 to attract the attention of users associated with portable client devices 104, and draw the users (and the portable client devices 104) to be proximally located by computing device 114, thereby enabling provision of navigational interface 212 to portable client device 114, and usage of the controls of navigation interface 212 to navigate and interact with higher level interactive messages 204. In embodiments, interactive messages 124 may include multi-media messages having text, graphics, video and/or audio content.

Interactive messages 124 may be any one of a number of product or service advertisements or public interest commercials. For example, interactive messages 124 may be a collection of messages designed to market an interactive game. Initial messages 202 may include messages that attract the attention of potential consumers, whereas higher level interactive messages 204 may be messages through which the potential consumers may explore various features or functionalities of the game. As another example, interactive messages 124 may be a collection of messages designed to inform the public about drug abuse. Initial messages 202 may include messages that attract the attention of potential audience, whereas higher level interactive messages 204 may be messages through which the potential audience may learn more about the dangers of different illegal drugs.

Figure 3:
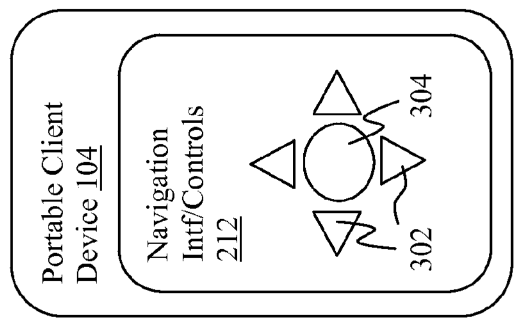
FIG. 3 illustrates an example navigation interface with controls, according to various embodiments.

Referring now to FIG. 3, wherein an example navigation interface with controls, according to various embodiments, is shown. In the illustrated embodiment, portable client device 104 may include a touch sensitive display screen. For the embodiments, navigation interface 212 with controls may include a number of soft keys, e.g., soft keys 302 for a user to direct movement of a cursor on display unit 112, and soft key 304 for a user to make a selection of an item displayed on display unit 112. Navigation interface 212 is merely intended to be illustrative. In alternative embodiments, a variety of other navigation interfaces with other controls may be provided instead. In particular, there may be different versions of navigation interface 212 configured for different types of portable client device 104.

Figure 4:
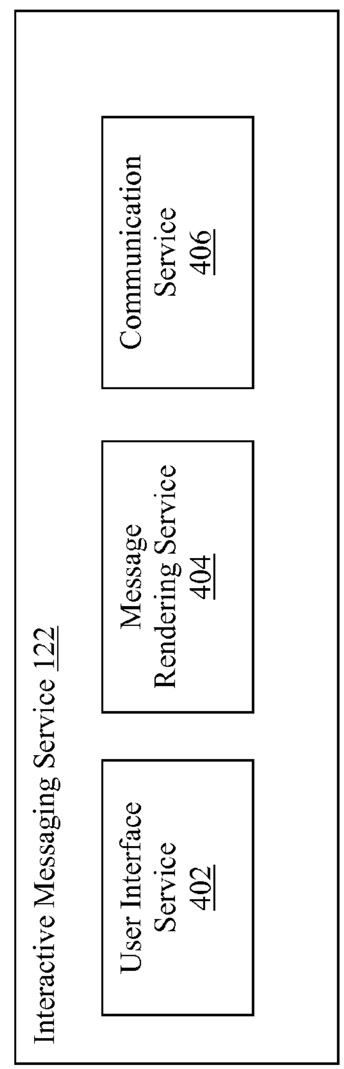
FIG. 4 illustrates an example interactive messaging service, according to various embodiments.

Referring now FIG. 4, wherein an example interactive messaging service, according to various embodiments, is illustrated. As shown, for the embodiments, interactive message service 122 may include user interface service 402, message rendering service 404 and communication service 406.

In embodiments, communication service 406 may be configured to broadcast invitation messages to invite proximally located portable client devices 104 to connect with computing device 114, and interact with displayed messages. Further, communication service 406 may be configured to establish a connection with a proximally located portable client device 102, when the proximally located portable client device 102 responds to the invitation messages. In embodiments configured to support interaction of displayed messages by multiple portable client devices 102, communication service 406 may be configured to limit the number of portable client devices 102 connected at one time. Communication service 406 may also be configured to seek the consent of the connected portable client device or devices 102, before actually connecting a responding portable client device 102 indicating interest to be connected.

In embodiments, user interface service 402 may be configured to provide a portable client device 102 with an appropriate version of navigation interface 212 to provide the navigation controls to interact with messages of a collection of interactive messages 124 displayed on display unit 112.

In embodiments, message rendering service 404 may be configured to select and render on display unit 112, messages of the collection of interactive messages 124, in response to the navigation controls provided through the navigation interface 212 provided to the proximally located portable client device 104.

In embodiments, user interface service 402 may be further configured to collect information from the proximally located portable client device 104 to determine whether the proximally located portable client device 104 is associated with a known user of a sponsor of the collection of messages 124. User interface service 402 may be further configured to contact a remote server (not shown) associated with the sponsor, via, e.g., a wide area network, to obtain information about the known user known to the sponsor. For these embodiments, message rendering service 404 may be further configured to select and render on display unit 112, messages of the collection 124, further based on information about the known user known to the sponsor.

Figure 5:
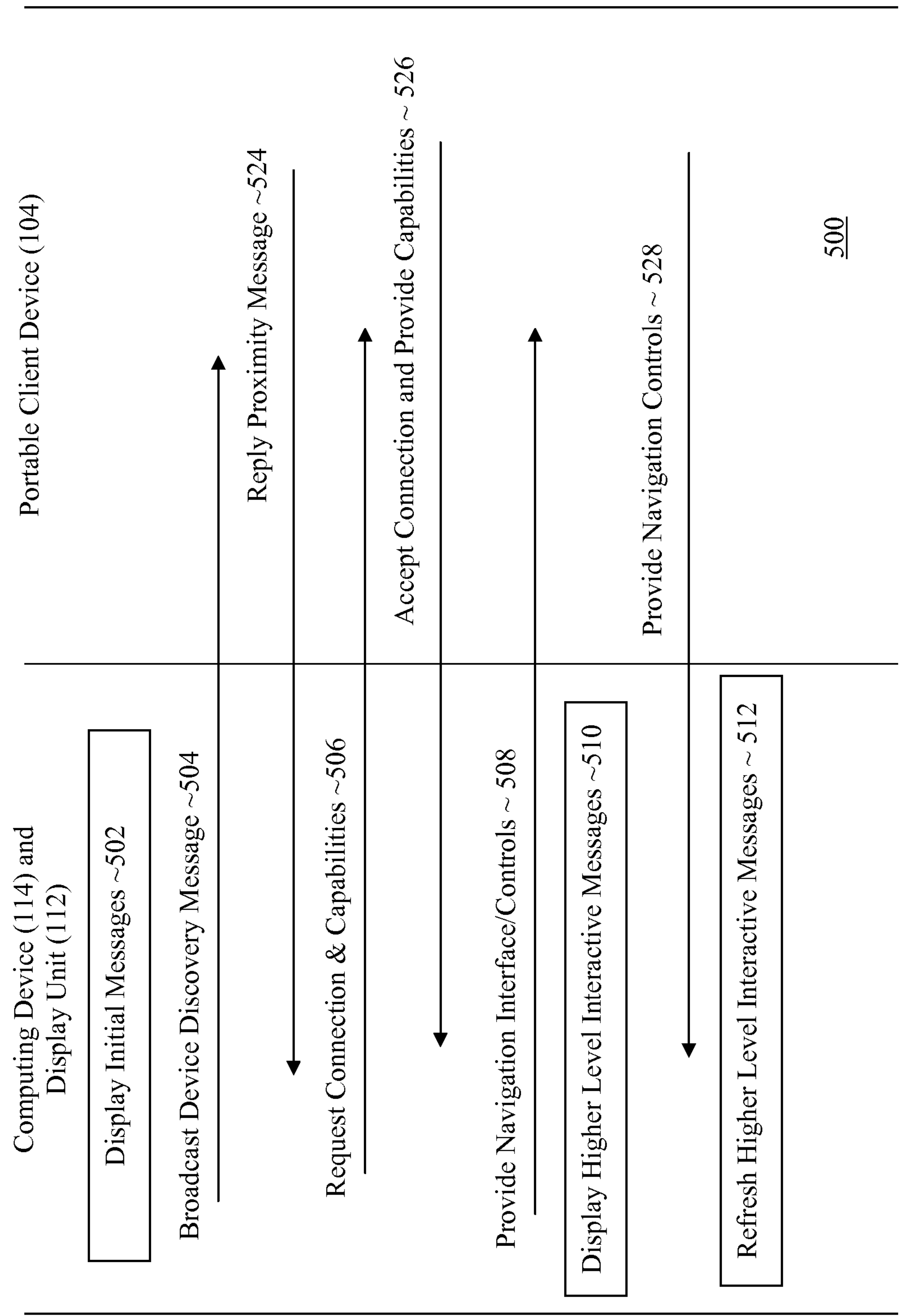
FIG. 5 illustrates an example interactive messaging process, according to the various embodiments.

Referring now to FIG. 5, wherein an example interactive messaging process, according to the various embodiments, is illustrated. As shown, process 500 may start with computing device 114 and display unit 112 displaying initial messages, 502. Concurrently, computing device 114 may periodically or continuously broadcast device discovery messages (also referred to as invitational messages) to effectively invite proximally located portable client device 104 to connect with computing device 114, 504.

In response, portable client device 104 may respond with reply proximity message, indicating portable client device 104 is proximally located to computing device 114, 524. On receipt of the reply proximity message, computing device 114 may request connection with portable client device 104, 506. In embodiments, computing device 114 may also inquire about the capabilities of portable client device 104, 506. Portable client device 104 in turn may accept the invitation to connect and provide the capability information, 526.

In embodiments, computing device 114 may explicitly inquire about the capabilities of portable client device 104, e.g., whether it has a touch sensitive display, its processor model, memory size, and so forth, and portable client device 104 may respond directly with the information. In other embodiments, computing device 114 may inquire about the capabilities of portable client device 104 indirectly, e.g., by inquiring about the model identification of portable client device 104. In still other embodiments, computing device 114 may send an agent onto of portable client device 104 to gather the relevant information.

On receipt of the acceptance and the capability information of portable client device 104, computing device 114 may provide portable client device 104 with an appropriate version of navigation interface 212 with control, 508. On provision of navigation interface 212, computing device 114 and display unit 112 may transition to start rendering the higher level interactive messages, 510. At this point, a user of portable client device 104 may provide navigation control to navigate and interact with the messages rendered, 528. In response to the received navigation control, computing device 114 and display unit 112 may navigate and update the higher level interactive messages rendered.

Figure 6:
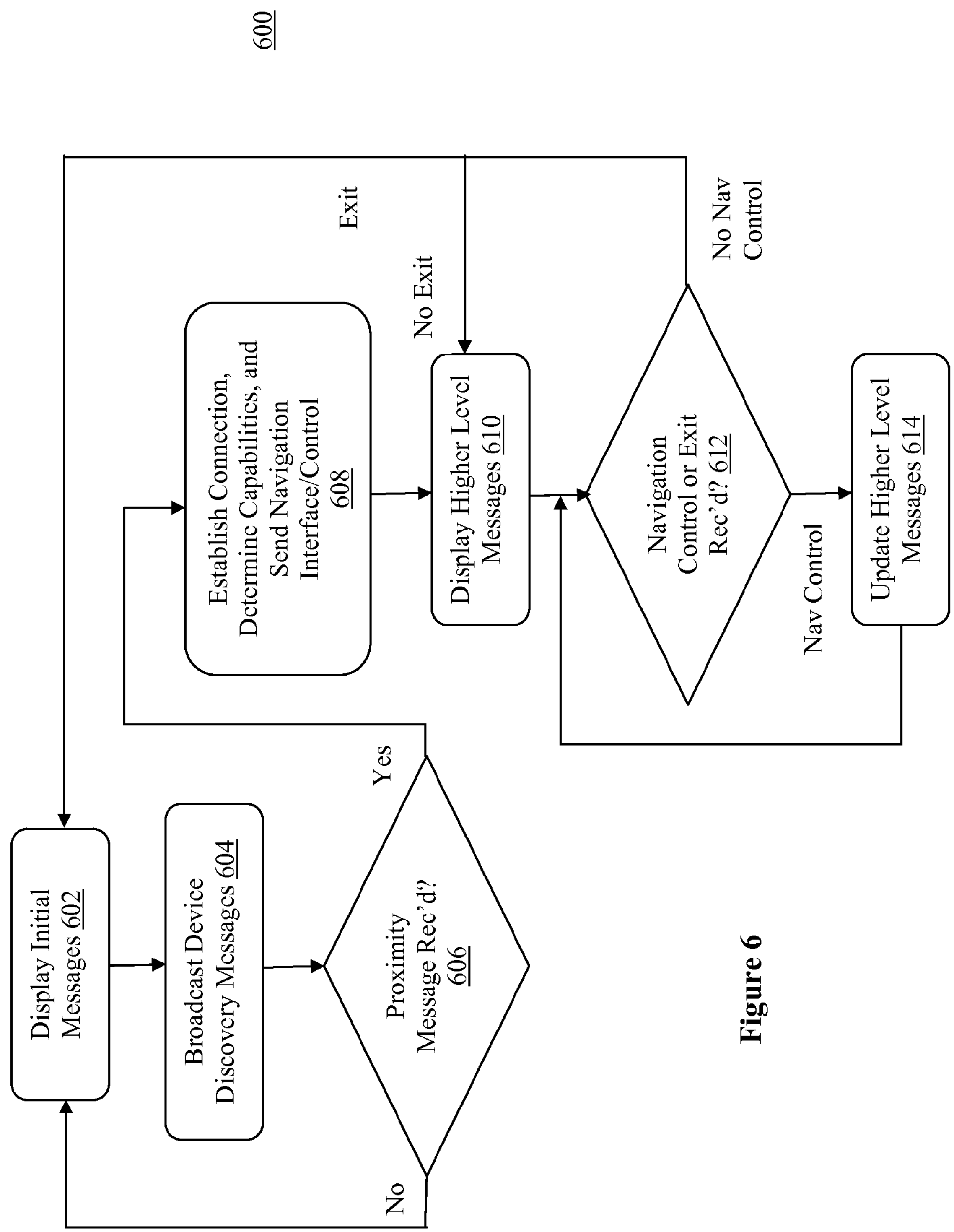
FIG. 6 illustrates an example operational flow of an interactive messaging service, according to various embodiments.

Referring now to FIG. 6, wherein an example operational flow of an interactive messaging service, according to various embodiments, is illustrated. As described earlier, example operational flow 600 may start with interactive message service 122 displaying initial messages, block 602. From block 602, flow 600 may proceed to block 604, wherein interactive message service 122 may broadcast device discovery message 604 (to serve as the invitation messages described with references to FIG. 5).

From block 604, flow 600 may proceed to block 606. At block 606, interactive message service 122 may determine whether a proximity message has been received from a responding portable client device 104. The proximity message may serve as an acceptance of the invitation messages described with references to FIG. 5. If no proximity message is received, process 600 may return to block 602, and continue therefrom, as earlier described.

From block 606, on determining that a proximity message has been received, flow 600 may proceed to block 608. At block 608, interactive message service 122 may establish connection with the proximally located portable client device 104, determine its capabilities, and provide an appropriate version of navigation interface 212 with controls. In embodiments, as described earlier, interactive message service 122 may seek the consent of connected portable client devices 104 before establishing connection with a responding portable client device 104.

From block 608, process 600 may proceed to block 610. At block 610, interactive message service 122 may render the higher level interactive messages. From block 610, process 600 may proceed to block 612. At block 612, interactive message service 122 may determine if a navigation control or an exit command has been received. From block 612, process 600 may proceed to block 614, if a navigation control has been received. At block 614, interactive message service 122 may update the higher level interactive messages accordingly. From block 614, process 600 may return to block 612, and proceed therefrom as earlier described.

Alternatively, from block 612, process 600 may return to block 610 if neither navigation control nor exit is received. At block 610, interactive message service 122 may proceed therefrom as earlier described. As a further alternative, from block 612, process 600 may disconnect an exiting portable client device 104, and return to block 602 if an exit command has been received. At block 602, interactive message service 122 may proceed therefrom as earlier described. In multi-client device embodiments, process 600 may further include the determination of whether the exiting portable client device 104 is the last exiting portable client device 104, before proceeding to block 602, and continues therefrom; otherwise (i.e., when the exiting portable client device 104 is not the last exiting portable client device), process 600 may return to block 610 and proceeds therefrom instead.

Figure 7:
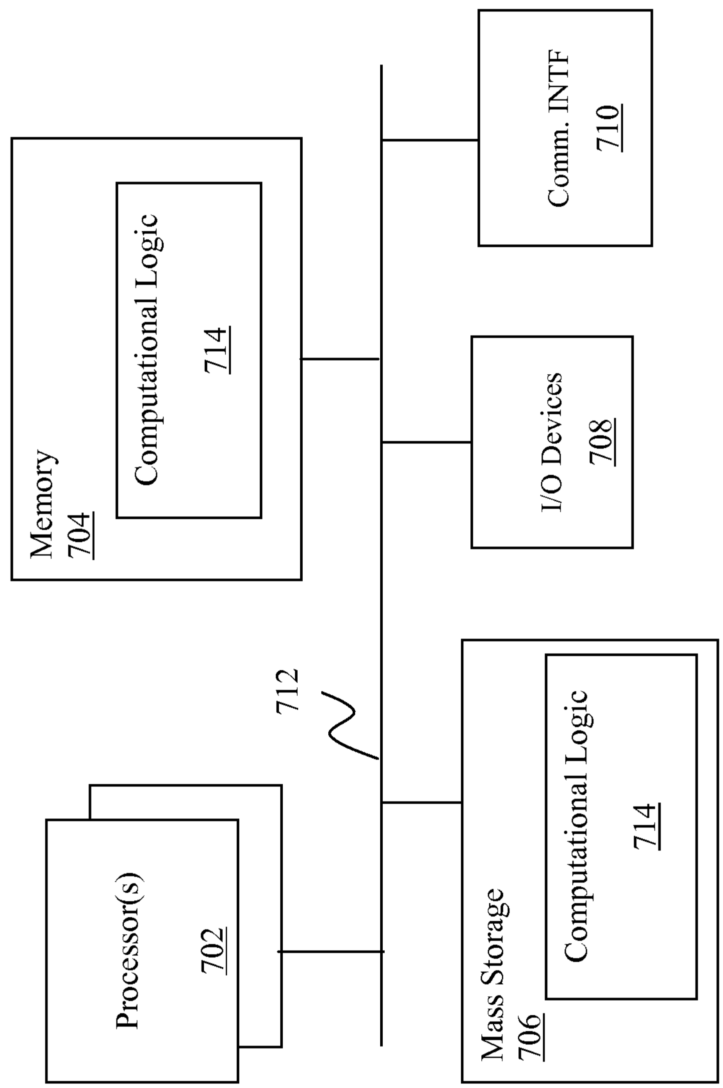
FIG. 7 illustrates an example computing system suitable for use as an interactive messaging computing device or a portable client device, according to various embodiments.

Referring now to FIG. 7, wherein an example computer suitable for use as computing device 114 or portable client device 104 of FIG. 1, in accordance with various embodiments, is illustrated. As shown, computer 700 may include one or more processors or processor cores 702, and system memory 704. For the purpose of this application, including the claims, the terms "processor" and "processor cores" may be considered synonymous, unless the context clearly requires otherwise. Additionally, computer 700 may include mass storage devices 706 (such as diskette, hard drive, compact disc read only memory (CD-ROM) and so forth), input/output devices 708 (such as display, keyboard, cursor control and so forth) and communication interfaces 710 (such as network interface cards, modems and so forth). The elements may be coupled to each other via system bus 712, which may represent one or more buses. In the case of multiple buses, they may be bridged by one or more bus bridges (not shown).

Each of these elements may perform its conventional functions known in the art. In particular, when used as computing device 114, system memory 704 and mass storage devices 706 may be employed to store a working copy and a permanent copy of the programming instructions implementing the operations associated with interactive messaging service 122 earlier described, collectively referred to as computational logic 722. The various elements may be implemented by assembler instructions supported by processor(s) 702 or high-level languages, such as, for example, C, that can be compiled into such instructions.

The permanent copy of the programming instructions may be placed into permanent storage devices 706 in the factory, or in the field, through, for example, a distribution medium (not shown), such as a compact disc (CD), or through communication interface 710 (from a distribution server (not shown)). That is, one or more distribution media having an implementation of the agent program may be employed to distribute the agent and program various computing devices.

The number, capability and/or capacity of these elements 710-712 may vary, depending on whether computer 700 is used as computing device 114 or portable client device 104. When used as portable client device 104, computing device 700 may be a smartphone, computing tablet, ereader, ultrabook or laptop. Otherwise, the constitutions of elements 710-712 are known, and accordingly will not be further described.

Figure 8:
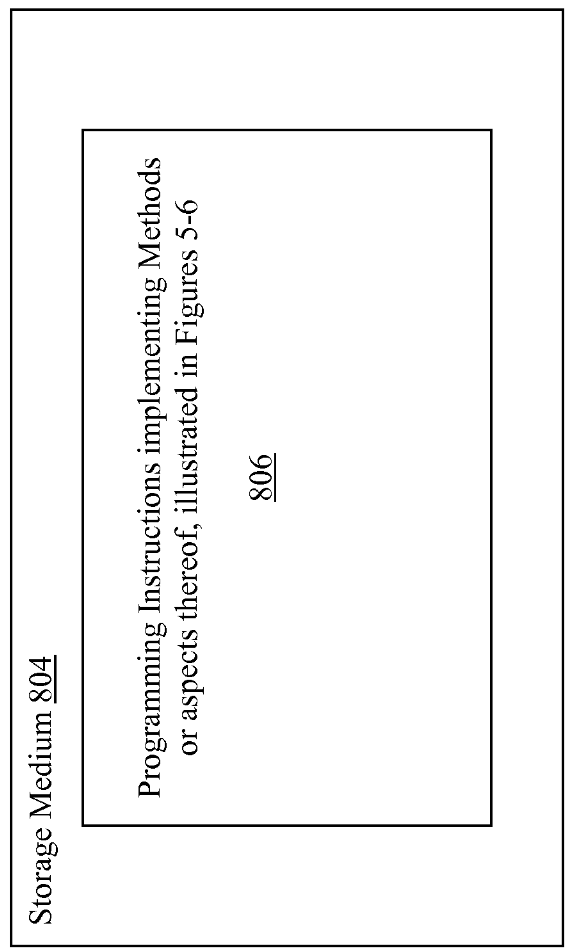
FIG. 8 illustrates an example storage medium having instructions to cause a computing device to practice aspects of interactive messaging, according to various embodiments.

FIG. 8 illustrates an example computer-readable non-transitory storage medium having instructions configured to practice all or selected ones of the operations associated with earlier described interactive messaging service 122, in accordance with various embodiments. As illustrated, non-transitory computer-readable storage medium 802 may include a number of programming instructions 804. Programming instructions 804 may be configured to enable a device, e.g., computer 800, in response to execution of the programming instructions, to perform, e.g., various operations of processes 500 and 600 of FIGS. 5-6, e.g., but not limited to, the operations associated with interactive messaging service 122. In alternate embodiments, programming instructions 804 may be disposed on multiple computer-readable non-transitory storage media 802 instead. In alternate embodiments, programming instructions 804 may be disposed on computer-readable transitory storage media 802, such as, signals.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus, comprising:

a display unit to display messages;

a computing device coupled to the display unit, including a communication unit; and an interactive message service to be operated by the computing device to selectively display messages of a collection of messages, in response to navigation controls received from a proximally located portable client device, through the communication unit;

wherein the interactive message service includes a user interface service to provide the client device with a navigation interface to provide the navigation controls to interact with messages of the collection displayed on the display unit; and a message rendering service to select and render on the display unit, messages of the collection, in response to the navigation controls provided through the navigation interface provided to the proximally located portable client device;

wherein the user interface service is to further collect information from the proximally located portable client device to determine whether the proximally located portable client device is associated with a known user of a sponsor of the collection of messages;

wherein the message rendering service to select and render on the display unit, messages of the collection, further based on information about the known user known to the sponsor; and wherein the interactive message service further includes a communication service to broadcast invitation messages to invite proximally located portable client devices to interact with displayed messages; establish a connection with a proximally located portable client device, when the proximally located portable client device respond to the invitation messages, and seek consent of connected client device (s), when there are connected client devices, before establishment of a connection with a responding proximally located portable client device.

2. The apparatus of claim 1, wherein the collection of messages includes initial non-interactive messages, and interactive messages, wherein the message rendering service is to select and render on the display unit the initial non-interactive messages, when no proximally located portable client device is connected with the apparatus, and select and render the interactive messages in response to the received navigation controls, when at least one proximally located portable client device is connected with the apparatus.

3. The apparatus of claim 1, wherein the user interface service is to further contact a remote server associated with the sponsor to obtain information about the known user known to the sponsor.

4. The apparatus of claim 1, wherein the collection of messages is an interactive advertisement.

5. The apparatus of claim 1, wherein the proximally located portable client device is a smartphone or a computing tablet.

6. The apparatus of claim 1, wherein the apparatus is a kiosk.

7. One or more non-transitory computer-readable storage medium comprising instructions to cause a computing system, in response to execution of the instructions, to:

provide a proximally located portable client device with a navigation interface to provide navigation controls to interact with messages of a collection of messages displayed on a display unit; and selectively update display of the messages, in response to navigation controls received from the proximally located portable client device, through the provided navigation interface;

wherein the computing system is further caused to collect information from the proximally located portable client device to determine whether the proximally located portable client device is associated with a known user of a sponsor of the collection of messages; and to select and render on the display unit, messages of the collection, based further on information about the known user known to the sponsor; and broadcast invitation messages to invite proximally located portable client devices to interact with displayed messages; establish a connection with a proximally located portable client device, when the proximally located portable client device responds to the invitation messages, and seek consent of connected client device(s), when there are connected client devices, before establishment of a connection with a responding proximally located portable client device.

8. The storage medium of claim 7, wherein the collection of messages includes initial non-interactive messages, and interactive messages, wherein the computing system is caused to select and render on the display unit the initial non-interactive messages, when no proximally located portable client device is connected with the computing system, and select and render the interactive messages in response to the received navigation controls, when at least one proximally located portable client device is connected with the computing system.

9. The storage medium of claim 7, wherein the computing system is further caused to contact a remote server associated with the sponsor to obtain information about the known user known to the sponsor.

10. The storage medium of claim 7, wherein the collection of messages is an interactive advertisement.

11. A method, comprising:

providing, by a computing system, to a proximally located portable client device with a navigation interface to provide navigation controls to interact with messages of a collection of messages displayed on a display unit; and selectively updating, by the computing system, display of the messages, in response to navigation controls received from the proximally located portable client device, through the provided navigation interface;

wherein the method further comprises seeking, by the computing system, consent of connected client device (s), when there are connected client devices, before establishing a connection with the proximally located portable client device;

broadcasting invitation messages to invite proximally located portable client devices to interact with displayed messages; establishing a connection with a proximally located portable client device, when the proximally located portable client device responds to the invitation messages, and seeking consent of connected client device(s), when there are connected client devices, before establishment of a connection with a responding proximally located portable client device.

12. The method of claim 11, wherein the collection of messages includes initial non-interactive messages, and interactive messages, wherein selectively updating comprises selecting and rendering on the display unit the initial non-interactive messages, when no proximally located portable client device is connected with the computing system, and selecting and rendering the interactive messages in response to the received navigation controls, when at least one proximally located portable client device is connected with the computing system.

13. The method of claim 11, further comprising collecting, by the computing system, information from the proximally located portable client device to determine whether the proximally located portable client device is associated with a known user of a sponsor of the collection of messages; and selecting and rendering on the display unit, messages of the collection, based further on information about the known user known to the sponsor.

14. The method of claim 13, further comprising contacting, by the computing system, a remote server associated with the sponsor to obtain information about the known user known to the sponsor.

* * * * *

UNITED STATES PATENT AND TRADEMARK OFFICE

CERTIFICATE OF CORRECTION

PATENT NO. : 9,594,494 B2
APPLICATION NO. : 14/285473
DATED : March 14, 2017
INVENTOR(S) : Travis Beaven et al.

It is certified that error appears in the above-identified patent and that said Letters Patent is hereby corrected as shown below:

On the Title Page

Inventors: "Travis Beaven, Woodinville, WA (US); Randy Anderson, Woodinville, WA (US)" should read -- Travis Beaven, Woodinville, WA (US); Ryan Anderson, Woodinville, WA (US) --

In the Specification

Column 8
Line 12, "...further based on information about the known" should read -- ...is further based on information about the known --

Lines 20-22, "portable client device respond to the invitation messages, and seek consent of connected client device (s), ..." should read -- portable client device responds to the invitation messages; and seek consent of connected client device(s), ... --

Columns 9-10
Lines 34-1, "...connected client device (s), ..." should read -- ...connected client device(s), ... --

Signed and Sealed this
Sixth Day of June, 2017

Michelle K. Lee
*Director of the United States Patent and Trademark Office*